United States Patent
Behn

[11] Patent Number: 5,944,936
[45] Date of Patent: Aug. 31, 1999

[54] PROCESS FOR LAMINATING A COVER SHEET ON EACH SIDE OF A BLANK AND AN APPARATUS TO ACCOMPLISH THE PROCESS

[75] Inventor: Rolf-Dieter Behn, Dusseldorf, German Dem. Rep.

[73] Assignee: Tunkers Maschinenbau GmbH, Ratingen, Germany

[21] Appl. No.: 08/838,250

[22] Filed: Apr. 17, 1997

[30] Foreign Application Priority Data

Apr. 23, 1996 [DE] Germany .............. 96 106 355

[51] Int. Cl.⁶ .................................................. B32B 31/00
[52] U.S. Cl. ........................................ 156/285; 156/312
[58] Field of Search ...................... 156/324, 555, 156/285, 312, 552, 556, 559

[56] References Cited

U.S. PATENT DOCUMENTS

| | | | |
|---|---|---|---|
| 4,288,274 | 9/1981 | Holz | 156/364 |
| 4,493,743 | 1/1985 | Lunding | 156/555 |
| 4,624,719 | 11/1986 | Völbel et al. | 156/60 |
| 4,897,147 | 1/1990 | Inselmann | 156/498 |
| 5,316,609 | 5/1994 | Guither et al. | 156/301 |

FOREIGN PATENT DOCUMENTS

| | | |
|---|---|---|
| 1511 291 | 6/1969 | Germany . |
| 29 45 442 A1 | 5/1981 | Germany . |
| 42 16 691 A1 | 11/1993 | Germany . |

Primary Examiner—James Sells
Attorney, Agent, or Firm—Brinks Hofer Gilson & Lione

[57] ABSTRACT

An apparatus and method for laminating a blank (1) with an upper cover sheet (3) on an upper side thereof and a lower cover sheet (6) on a lower side thereof wherein each of the sheets (3,6) and blank (1) are attached to each other with glue and under pressure, and wherein during a run the blank (1) is laminated on an upper and lower side thereof with one cover sheet (3,6) each.

8 Claims, 3 Drawing Sheets

PROCESS FOR LAMINATING A COVER SHEET ON EACH SIDE OF A BLANK AND AN APPARATUS TO ACCOMPLISH THE PROCESS

BACKGROUND OF THE INVENTION

The present invention relates to a system and method for laminating covers sheets on sides of a blank, and in particular wherein said laminating calls for the application of glue and pressure.

Single and double-sided laminating of blanks with one cover sheet each is known. In single-sided laminating, the upper side of a blank is supplied with a glue required for attachment in a gluer. A subsequent pressing device then binds the two sheets together. If, however, the blank must be laminated with a cover sheet on both sides, then it is necessary to first laminate one cover sheet to the blank as in the process described above and thereafter the blank so laminated must be turned 180 degrees in a stacking and turning device and then sent through the apparatus again. This results in use of the equipment twice as long as would actually be necessary. After turning, the blank with the laminated cover sheet must be positioned in the laminating device on the opposite edge of the sheet. Repositioning the buffers requires even more set-up time. Furthermore, it is disadvantageous that after the first run, the blank with the cover sheet laminated on one side must normally be stored in the interim. During this interim storage, the glue may dry up which leads to deformation of the blank. Such deformed blanks can lead to malfunctions when they are fed into the gluer and to inexact laminating of the second cover sheet.

Accordingly, it is an object of the invention to create a process that completely overcomes the disadvantages of the prior art and furthermore has the advantage of better performance and higher quality. In addition, it is a further object to provide an apparatus wherein the aforementioned process can be accomplished.

SUMMARY OF THE INVENTION

To address the above concerns, the present invention provides a process and an apparatus for laminating one cover sheet on each of two sides of a blank. Accordingly, in one run, that is, in a continuous operation, a cover sheet can be laminated onto both the upper and lower sides of a blank, as viewed in the flow direction, with one cover sheet on each side.

BRIEF DESCRIPTION OF THE DRAWINGS

An embodiment of the invention is illustrated by way of example, in part schematically, in the drawings of which the following are shown.

DETAILED DESCRIPTION OF THE PRESENTLY PREFERRED EMBODIMENTS

Figure 1:
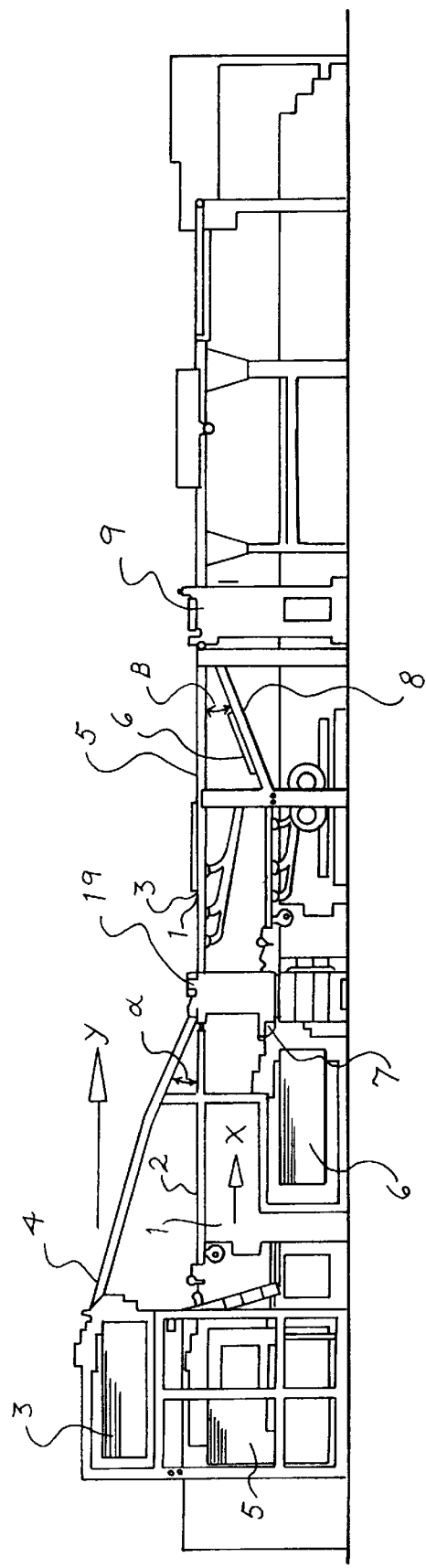
FIG. 1 is a side view of an apparatus according to the invention.

A stack of blanks 1 are placed in a frame from which they are individually transported via a motor-driven conveyor 2 in a direction X. A stack of upper cover sheets 3 is placed above the stack of blanks 1. The upper cover sheets 3 are conveyed one after the other by means of a motor-driven conveyor 4 in direction Y below a sharp angle α to the horizontally running conveyor direction X downward to the level of the blanks 1. In a first laminating station 19, the upper cover sheets 3 are provided with a coat of glue on their lower side and laminated to the blank 1 by means of pressure in a succeeding pressure.

The blank 1 with a cover sheet 3 laminated to its upper side is then conveyed by means of a motor-driven conveyor 5 formed as a conveyor belt in direction X. Below conveyor 2, a stack of lower cover sheets 6 has been placed which are also transported via a motor-driven conveyor 7 in a horizontal direction in direction X until they reach the motor-driven conveyor 8 upon which the lower cover sheet 6 is conveyed at a sharp angle β to the conveyor track of conveyor 5.

The blanks 1 with upper cover sheets 3 laminated to them are conveyed via the conveyor 5 to a second laminating station 9. Thereafter the blank 1 laminated on one side is transferred to the conveyor 5 with the aid of a vacuum suction belt 10 and transported to a rotatable buffer 11 and thereby aligned in conveyor direction X. Thereafter, the blank 1 laminated on one side is laterally aligned by means of two adjustable lateral buffers 12 orthogonally to conveyor direction X. Only one of these lateral buffers 12 is visible in FIG. 2. Another lateral buffer is placed on the opposite side. The lateral buffers 12 are motor driven, for example by means of piston/cylinder units to be acted upon with hydraulic or pneumatic pressure alternately on both sides, by means of an induction motor, or the like.

Figure 2:
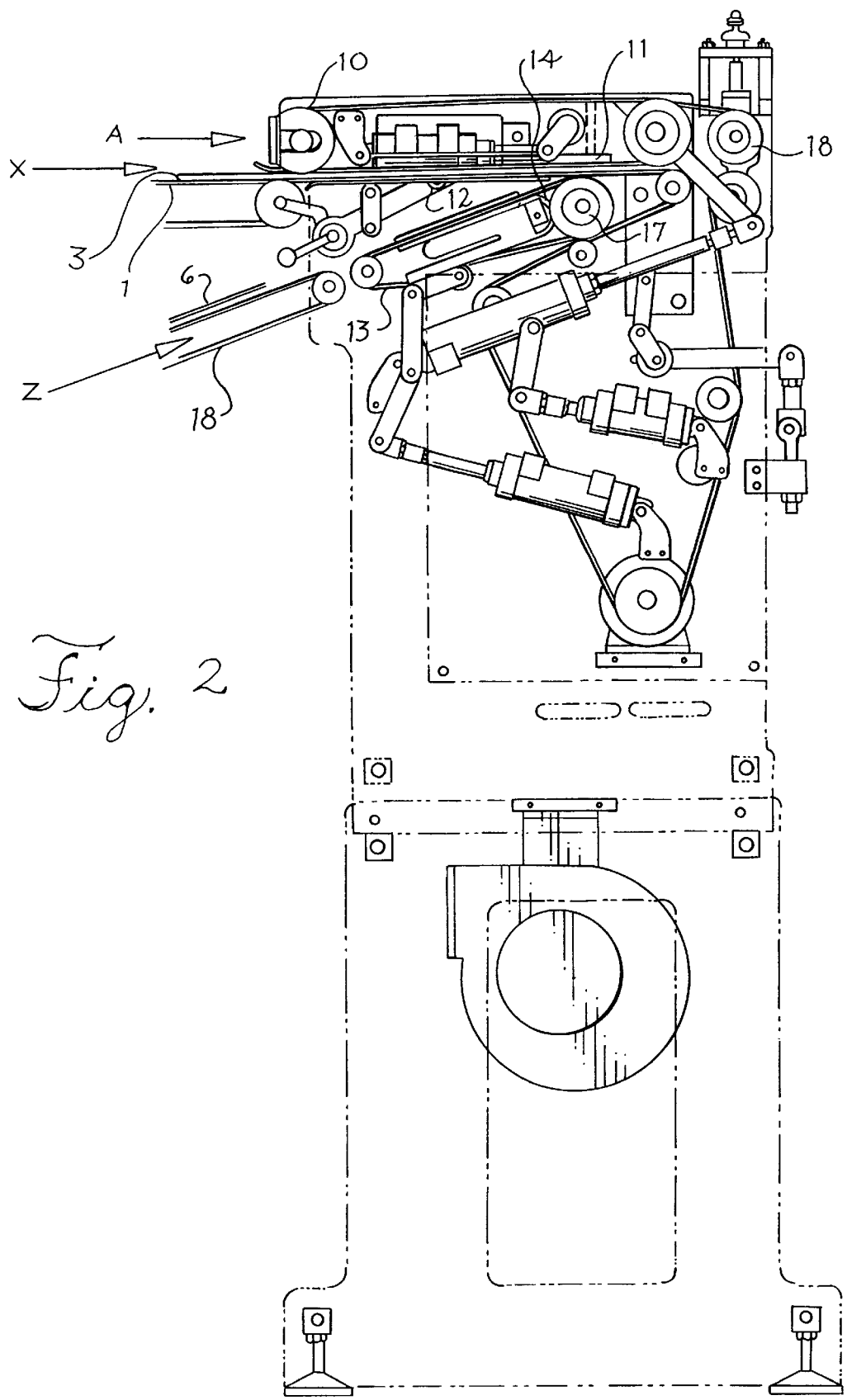
FIG. 2 is a partial view of FIG. 1 in the area of the second laminating station for feeding the lower cover sheet, enlarged.

As can be seen in FIG. 2, the buffer 11 can be folded up or turned in the position marked by a dotted line. The lower cover sheet 6 is glued on its lower side facing the blank 1 laminated on one side and likewise fed by means of the motor-driven conveyor 8 to the second laminating station 9.

Figure 3:
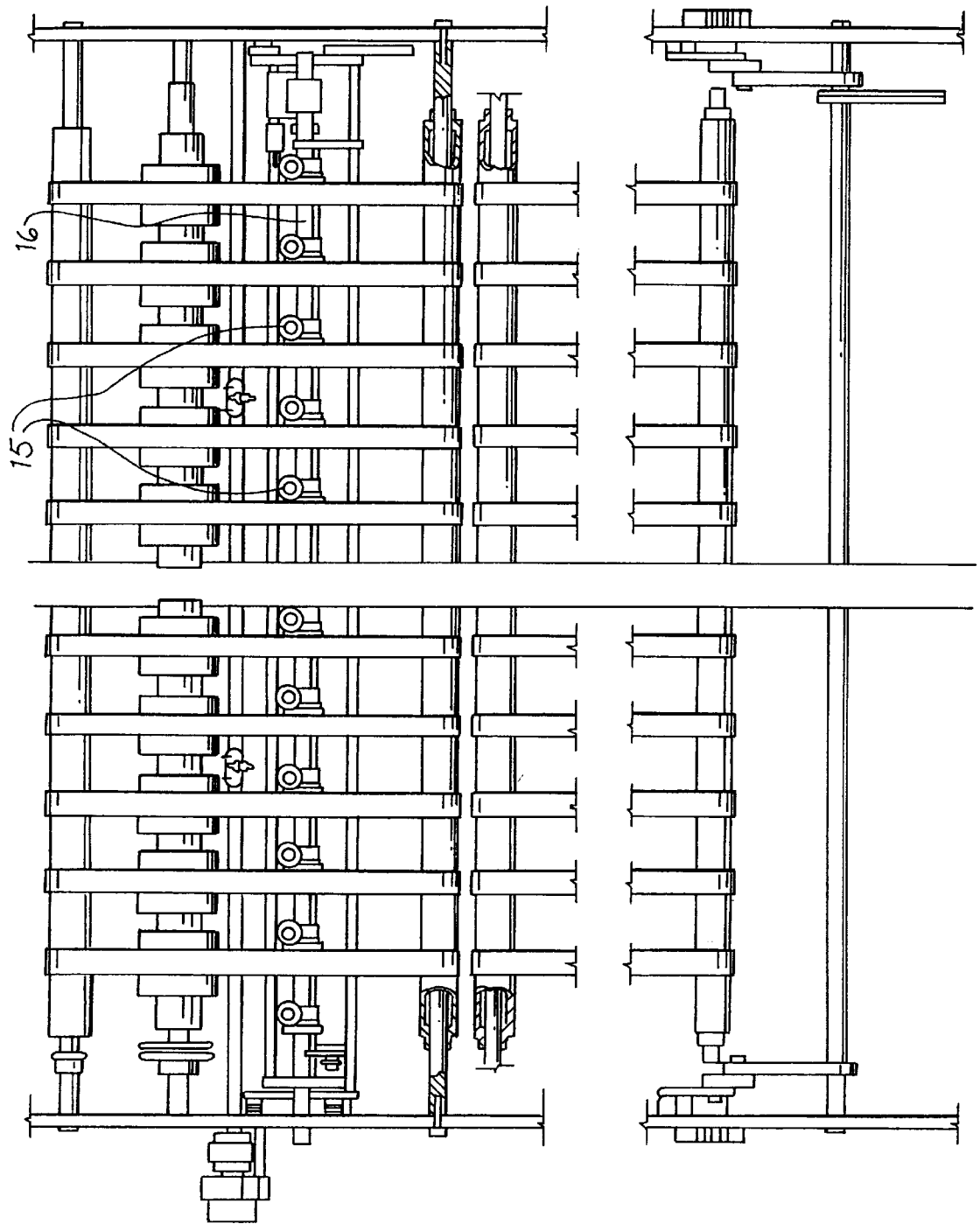
FIG. 3 is a view in the direction of arrow A in FIG. 2.

Another motor-driven conveyor 13 then takes the glued lower cover sheet 6 and transports it to a rotatable buffer 14. The lower cover sheet 6 is thus aligned in transport direction Z. Thereafter, the lower cover sheet 6 is suctioned by means of a suction device 15 which is clearly illustrated in FIG. 3. This suction device 15 has a plurality of large suction cups laterally placed in a straight line orthogonal to the conveyor direction Z, each of which suction cups is attached to a feed tube 16 via a connector not further described, which feed tube 16 is attached to a motor-driven vacuum source, in particular a pressure pump, not illustrated.

The lower cover sheet 6 is now transported laterally by means of the suction device 15 with the aid of a motor-operated drive, for example a stepper motor, until the correct position in relation to the blank 1 is recognized, such that the lower cover sheet 6 comes to rest correctly in relation to the path and corners of the blank 1 already laminated on its upper side. Thereafter buffer 14 is put in the open position and the suctioned lower cover sheet 6 is transported by means of a sliding movement to the buffer 11 for the blank. Thereupon, the rotatably mounted buffer 14 is retracted and the lower cover sheet 6 is transported further by means of an intermittent roller 17 to the two adjustable press-rollers 18 which attach the blank 1 laminated on one side to the lower cover sheet 6 by means of laminating.

The drives and movements are incorporated in an appropriate control system and may be remotely operated from a control panel not illustrated. Furthermore, it is possible to call up the sequence of movements on a PC and observe them.

It is contemplated as part of an embodiment that the second laminating station 9 could also be used alone.

Where conveyors are mentioned herein, they may refer to conveyor belts or tracks which in general operate continuously.

The features described in the summary, the patent claims, and the description, as well as those visible in the drawing, may be essential both individually and in any combination for the realization of the invention.

In an embodiment of the present invention, there is provided a process and/or apparatus that enables a continuous run of blanks for two-sided laminating. If needed, however, single-sided laminating is also possible using this process. In that case, the cover sheet is simply omitted on the side of the blank that is not to be laminated. Another advantage is achieved in that the set-up costs are reduced considerably over those of the prior art since, among other reasons, the buffers no longer need to be repositioned.

Since interim storing is no longer needed for blanks that have been laminated on only one side, no deformations will develop so the quality of the blanks laminated on two sides is clearly better than that of the previously known process.

Since the work can be accomplished in a continuous run, a considerably higher nominal output results. Since a turning procedure is no longer required, energy savings are realized that can amount to up to 40 percent, including loading and unloading for the second run, compared to the prior art.

When considered as a whole, the process according to the present invention ensures jobs and thereby livelihoods.

In an embodiment, the lower cover sheet is fed to the blank at a sharp angle. This allows for a gradual laminating of the lower cover sheet on the lower side of the blank, so that air is not trapped. Advantageously, in a further embodiment, the upper cover sheet is also fed to the blank at a sharp angle.

In a very advantageous process according to the present invention, the upper cover sheet is attached to the blank by laminating in one run before the lower cover sheet is fed to the blank and attached to the latter by laminating. In the process according to the present embodiment, the upper sides of the blanks and the cover sheets coming from below are provided with glue on their upper sides.

According to an embodiment, the blank and the cover sheet are each provided with glue while in a horizontal position, before the cover sheet is moved along a track which runs in a sharp angle to the transport level of the blank. This allows for rapid and dripless application of the glue before it is laminated to the blank.

Accordingly in an embodiment, at a minimum the lower cover sheet is aligned exactly with the corners and path of the blank at a right angle and/or in the flow direction of the blank. This eliminates any reworking, for example cutting corners on a blank that has been laminated on both sides.

It is especially advantageous in an embodiment that the lower cover sheet can be moved by means of negative pressure (i.e. vacuum) for the purpose of aligning it independent of the blank. Through this means, for example, one is able to move the lower cover sheet to one side or the other orthogonally in relation to the flow direction of the blank, or if needed in the direction of the axis of the conveyor, in order to achieve an exact alignment of the corners and path of the cover sheet in question in relation to the blank.

According to an embodiment of the present invention, a blank with one cover sheet already laminated to it is stopped before the exact feeding and laminating of the lower cover sheet and aligned diagonally to the direction of the conveyor, before the cover sheet is aligned with and attached to the lower side of the blank. Thus, one is able to preset coordinates or levels at which the blank is to be placed to which the cover sheet to be laminated, in particular the lower cover sheet, is fed. The positioning points of the blank already laminated on one side can be entered in a control system and thereafter, based on these values, the lower cover sheet can be fed to the blank already laminated on one side in exact alignment with the path and corners of the latter and attached to it by means of laminating.

An apparatus accordingly to one embodiment includes a motor-driven conveyor placed below the conveyor track for the blank the conveyor track of which the motor-driven conveyor runs at a sharp angle to the conveyor track of the blank, upon which the lower cover sheet is advanced at a sharp angle by means of the motor-driven conveyor. A minimum of one but preferably two alignment devices placed at a distance to each other and steered by a motor are placed at the motor-driven conveyor for the blank, through which alignment devices the blank moves orthogonally in relation to the conveyor direction and can thereby be aligned.

In an advantageous embodiment, both the conveyor for the blank laminated with the upper cover sheet and the conveyor for the lower cover sheet are each provided with a motorized, particularly pneumatic, mobile buffer extending in each case into the conveyor path. Thus, the blank laminated on one side runs from the conveyor on which it is located hits the buffer, whereupon the movement of the conveyor is shut down, while the lower cover sheet is likewise moved over its conveyor until it hits the buffer associated with it, whereupon the movement of this conveyor is also shut down. Thereafter, the lateral alignment of the blank laminated on one side is accomplished by means of the alignment device, whereupon the diagonal alignment of the lower cover sheet and feeding of the aligned cover sheet to the lower side of the blank follows, whereupon the blank already laminated on one side is attached through laminating with the lower cover sheet in a press device.

Other advantageous embodiments are motorized, e.g. pneumatic and/or electrical, drives, the alignment device, buffers and the suction device with their motor drives are each incorporated in a sequence control which controls the sensible sequence of movements of the conveyors, the buffers and the suction devices, as well as the gluing devices.

It is intended that the foregoing detailed description be regarded as illustrative rather than limiting and that it is understood that the following claims including all equivalents are intended to define the scope of the invention.

I claim:

1. A process for laminating a blank (1) with an upper cover sheet (3) on an upper side thereof and a lower cover sheet (6) on a lower side thereof wherein each of the sheets (3,6) and blank (1) are attached to each other with glue and under pressure, and wherein during a run upper cover sheet (3) is first attached to the blank (1) in a flow direction (X) before the lower cover sheet (6) is fed to the blank (1) and attached thereto by means of laminating.

2. The process according to claim 1, characterized in that the lower cover sheet (6) is fed to a lower side of the blank (1) below an acute angle ($\beta$).

3. The process according to claim 1 or claim 2, characterized in that the upper cover sheet (3) is fed below an acute angle ($\alpha$) to an upper side of the blank (1).

4. The process according to claim 1 characterized in that the cover sheet (6) is provided with glue.

5. A process for laminating a blank (1) with an upper cover sheet (3) on an upper side thereof and a lower cover sheet (6) on a lower side thereof wherein each of the sheets (3,6) and blank (1) are attached to each other with glue and under pressure, and wherein during a run the blank (1) is laminated on an upper and lower side thereof with one cover sheet (3,6) each, and characterized in that the blank (1) and the cover sheet (6) are each provided with glue while in a horizontal position before the cover sheet (6) is moved along a track which runs at a sharp angle to a level on which the blank (1) is transported.

6. The process according to claim 1 characterized in that at least the lower cover sheet (6) is automatically aligned at a right angle to a flow direction (X) of the blank (1) in exact relation to edges and a path of the blank (1).

7. The process according to claim 6, characterized in that at least the lower cover sheet (6) is transported by negative pressure to align it independent of the blank (1).

8. The process according to claim 1 characterized in that the blank (1) to which the upper cover sheet (3) has already been laminated is stopped before feeding and laminating with the lower cover sheet (6) and aligned at a right angle to a flow direction (X) before the lower cover sheet (6) is aligned and attached to the lower side of the blank (1).

* * * * *